United States Patent
Lee et al.

(10) Patent No.: US 10,864,605 B2
(45) Date of Patent: Dec. 15, 2020

(54) HIGH STRENGTH WELDING JOINT HAVING EXCELLENT IMPACT TOUGHNESS AT VERY LOW TEMPERATURE, AND FLUX-CORED ARC WELDING WIRE THEREFOR

(71) Applicant: POSCO, Pohang-si (KR)

(72) Inventors: Bong-Keun Lee, Pohang-si (KR); Sang-Chul Lee, Pohang-si (KR); Il-Wook Han, Pohang-si (KR); Jeong-Kil Kim, Pohang-si (KR)

(73) Assignee: POSCO, Pohang-si (KR)

( * ) Notice: Subject to any disclaimer, the term of this patent is extended or adjusted under 35 U.S.C. 154(b) by 259 days.

(21) Appl. No.: 16/189,232

(22) Filed: Nov. 13, 2018

(65) Prior Publication Data

US 2019/0084096 A1  Mar. 21, 2019

Related U.S. Application Data

(62) Division of application No. 15/032,455, filed as application No. PCT/KR2013/012146 on Dec. 24, 2013, now abandoned.

(30) Foreign Application Priority Data

Dec. 6, 2013 (KR) .................. 10-2013-0151443
Dec. 6, 2013 (KR) .................. 10-2013-0151444

(51) Int. Cl.

| | |
|---|---|
| *B23K 35/30* | (2006.01) |
| *B23K 35/22* | (2006.01) |
| *B23K 35/00* | (2006.01) |
| *B23K 9/24* | (2006.01) |
| *C22C 38/18* | (2006.01) |
| *C22C 38/04* | (2006.01) |
| *C22C 38/12* | (2006.01) |
| *C22C 38/22* | (2006.01) |
| *C22C 38/28* | (2006.01) |
| *B23K 35/02* | (2006.01) |
| *C22C 38/00* | (2006.01) |
| *C22C 38/02* | (2006.01) |
| *C22C 38/06* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |

(52) U.S. Cl.
CPC ...... *B23K 35/3073* (2013.01); *B23K 35/0266* (2013.01); *B23K 35/30* (2013.01); *B23K 35/3053* (2013.01); *B23K 35/3086* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/12* (2013.01); *C22C 38/18* (2013.01); *C22C 38/22* (2013.01); *C22C 38/28* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01)

(58) Field of Classification Search
CPC .................. B23K 9/24; B23K 35/00; B23K 35/3053–3073; B23K 35/308–3086
See application file for complete search history.

(56) References Cited

U.S. PATENT DOCUMENTS

| | | | | |
|---|---|---|---|---|
| 4,010,309 | A * | 3/1977 | Petersen | B23K 35/302 |
| | | | | 428/386 |
| 4,017,711 | A | 4/1977 | Honma et al. | |
| 5,120,931 | A * | 6/1992 | Kotecki | B23K 35/308 |
| | | | | 219/146.22 |
| 7,951,469 | B2 | 5/2011 | Osuki et al. | |
| 2012/0160363 | A1 | 6/2012 | Jin et al. | |
| 2013/0292362 | A1 * | 11/2013 | Fairchild | B23K 35/3053 |
| | | | | 219/74 |
| 2015/0099140 | A1 * | 4/2015 | Amata | B23K 35/0266 |
| | | | | 428/659 |
| 2015/0228376 | A1 * | 8/2015 | Ranganathan | B29C 48/022 |
| | | | | 428/391 |
| 2016/0236302 | A1 * | 8/2016 | Ogborn | B23K 35/3053 |

(Continued)

FOREIGN PATENT DOCUMENTS

| | | |
|---|---|---|
| CN | 101925436 | 12/2010 |
| EP | 2289661 | 3/2011 |

(Continued)

OTHER PUBLICATIONS

European Search Report—European Application No. 13898649.2, dated Oct. 31, 2016, citing KR 2013 0003686, KR 2013 0003685 and U.S. Pat. No. 4,017,711.

(Continued)

*Primary Examiner* — Michael A Laflame, Jr.
(74) *Attorney, Agent, or Firm* — Cantor Colburn LLP

(57) ABSTRACT

A high strength welding joint having excellent toughness at low temperature obtained by welding a cryogenic high-strength high-Mn steel, comprising 0.1-0.61 wt % of C, 0.23-1.0 wt % of Si, 14-35 wt % of Mn, 6 wt % or less of Cr, 1.45-3.5 wt % of Mo, 0.02 wt % or less of S, 0.02 wt % or less of P, 0.001-0.01 wt % of B, 0.001-0.2 wt % of Ti, 0.001-0.3 wt % of N, and balance of Fe and inevitable impurities; and a flux-cored arc welding wire comprising 0.15-0.8 wt % of C, 0.2-1.2 wt % of Si, 15-34 wt % of Mn, 6 wt % or less of Cr, 1.5-4 wt % of Mo, 0.02 wt % or less of S, 0.02 wt % or less of P, 0.01 wt % or less of B, 0.1-0.5 wt % of Ti, 0.001-0.3 wt % of N, 4-15 wt % of $TiO_2$, 0.01-9 wt % of at least one of $SiO_2$, $ZrO_2$ and $Al_2O_3$, 0.5-1.7 wt % of at least one of alkali elements including K, Na, and Li, 0.2-1.5 wt % of at least one of F and Ca, and balance of Fe and inevitable impurities.

4 Claims, No Drawings

(56) References Cited

U.S. PATENT DOCUMENTS

2016/0271736 A1* 9/2016 Han .................. B23K 35/24
2017/0173744 A1* 6/2017 Tseng ................ B23K 35/362

FOREIGN PATENT DOCUMENTS

| EP | 2289661 B1 * | 4/2014 | ............ B23K 35/02 |
|----|---|---|---|
| JP | 49052737 | 5/1974 | |
| JP | 56059597 | 5/1981 | |
| JP | 02104633 | 4/1990 | |
| JP | 2007126715 | 5/2007 | |
| JP | 2010227949 | 10/2010 | |
| JP | 2013142160 | 7/2013 | |
| KR | 20030050385 | 6/2003 | |
| KR | 20120074150 | 7/2012 | |
| KR | 20120111432 | 10/2012 | |
| KR | 20130003685 | 1/2013 | |
| KR | 20130003686 | 1/2013 | |

OTHER PUBLICATIONS

International Search Report—PCT/KR2013/012146 dated Sep. 18, 2014.

* cited by examiner

HIGH STRENGTH WELDING JOINT HAVING EXCELLENT IMPACT TOUGHNESS AT VERY LOW TEMPERATURE, AND FLUX-CORED ARC WELDING WIRE THEREFOR

TECHNICAL FIELD

The present disclosure relates to a high-strength welding joint having a high degree of cryogenic impact toughness and a flux-cored arc welding wire for forming the high-strength welding joint, and more particularly, to a welding joint having a high degree of low-temperature impact toughness and a high degree of room-temperature yield strength due to high-toughness austenite being maintained in the welding joint even under cryogenic environments, and a flux-cored arc welding wire for forming the welding joint.

BACKGROUND ART

Along with the recent explosive increase in the demand for liquefied natural gas (LNG), the demand for transportation facilities and storage tanks for transporting and storing LNG has also explosively increased. Thus, tanks for transporting or storing LNG are required to have a structure capable of resisting impacts at temperatures equal to or lower than the temperature of LNG, −162° C. For this, materials having a high degree of cryogenic impact toughness such as aluminum (Al), 9% Ni steel, and stainless steel (hereinafter referred to as STS) are generally used.

However, aluminum (Al) has a low degree of tensile strength, and thus thick aluminum plates have to be used. In addition, aluminum (Al) has poor weldability. Moreover, welding materials formed of 9% Ni steel (for example, Inconel 625 having a nickel content of 50 wt % or greater and a chromium content of 20 wt % or greater) are expensive and have a low degree of weld zone yield strength. STS has problems such as high prices or low thermal deformation, and the cryogenic properties of STS have not been guaranteed.

Therefore, what is needed is the development of cryogenic high-manganese welding joints including manganese (Mn) instead of relatively expensive nickel (Ni) to guarantee weldability and stabilize austenite.

To this end, the formation of welding joints having an impact toughness of 27 J or greater may be required to secure the stability of weld structures at a very low temperature, −196° C. or less. The grade of yield strength of high-manganese (Mn) steels was 360 MPa at room temperature according to earlier studies. However, the grade of yield strength of the current high-manganese steels is 500 MPa to 800 MPa. Therefore, if welding materials having a degree of yield strength of 360 MPa are used, welding joints having relatively low strength are formed. When such structures including welding joints having relatively low strength are designed, the design may be focused on the welding joints, and thus thick steel sheets may have to be used.

Therefore, to address these problems, welding materials having a degree of room-temperature yield strength within the range of 400 MPa or greater are required. In the related art, due to this reason, welding materials having high contents of nickel (Ni) and chromium (Cr) (Ni: 50 wt % or greater, and Cr: 20 wt % or greater) are used to guarantee the required strength. That is, in the related art, welding materials or welding joints having low contents of alloying elements and incurring low costs have not been developed.

DISCLOSURE

Technical Problem

An aspect of the present disclosure may provide a welding joint formed by submerged, flux-cored, or gas metal arc welding and having a high degree of low-temperature impact toughness and a high degree of room-temperature yield strength due to high-toughness austenite being maintained in the welding joint even under cryogenic environments, and high-temperature cracking is prevented during welding.

An aspect of the present disclosure may also provide a flux-cored arc welding wire for forming the welding joint.

However, aspects of the present disclosure are not limited thereto. Additional aspects will be set forth in part in the description which follows, and will be apparent from the description to those of ordinary skill in the related art.

Technical Solution

According to an aspect of the present disclosure, there is provided a high-strength welding joint having a high degree of cryogenic toughness and obtained by welding parts of a cryogenic high-strength high-manganese steel, the high-strength welding joint including, by wt %, carbon (C): 0.1% to 0.61%, silicon (Si): 0.23% to 1.0%, manganese (Mn): 14% to 35%, chromium (Cr): 6% or less, molybdenum (Mo): 1.45% to 3.5%, sulfur (S): 0.02% or less, phosphorus (P): 0.02% or less, boron (B): 0.001% to 0.01%, titanium (Ti): 0.001% to 0.2%, nitrogen (N): 0.001% to 0.3%, and a balance of iron (Fe) and inevitable impurities.

The high-strength welding joint may further include at least one selected from tungsten (W), niobium (Nb), and vanadium (V) in a total amount of 5 wt % or less.

The high-strength welding joint may further include yttrium (Y) and/or a rare earth metal (REM) in an amount of 0.1 wt % or less.

The high-strength welding joint may further include nickel (Ni) in an amount of 10 wt % or less.

The high-manganese steel may have a basic composition of $Mn_{24}C_{0.4}Cr_4Si_{0.3}$.

According to another aspect of the present disclosure, there is provided a flux-cored arc welding wire having a high degree of strength and a high degree of cryogenic impact toughness, the flux-cored arc welding wire including, wt %, carbon (C): 0.15% to 0.8%, silicon (Si): 0.2% to 1.2%, manganese (Mn): 15% to 34%, chromium (Cr): 6% or less, molybdenum (Mo): 1.5% to 4%, sulfur (S): 0.02% or less, phosphorus (P): 0.02% or less, boron (B): 0.01% or less, titanium (Ti): 0.09% to 0.5%, nitrogen (N): 0.001% to 0.3%, $TiO_2$: 4% to 15%, at least one selected from $SiO_2$, $ZrO_2$, and $Al_2O_3$: 0.01% to 9% in total content, at least one selected from potassium (K), sodium (Na), and lithium (Li): 0.5% to 1.7% in total content, at least one of fluorine (F) and calcium (Ca): 0.2% to 1.5%, and a balance of iron (Fe) and inevitable impurities.

The flux-cored arc welding wire may further include at least one selected from tungsten (W), niobium (Nb), and vanadium (V) in a total amount of 5 wt % or less.

The flux-cored arc welding wire may further include yttrium (Y) and/or a rare earth metal (REM) in an amount of 1 wt % or less.

The flux-cored arc welding wire may further include nickel (Ni) in an amount of 10 wt % or less.

Advantageous Effects

The welding joint according to the aspect of the present disclosure has a high degree of low-temperature impact toughness and a high degree of room-temperature yield strength because high-toughness austenite is maintained in the welding joint even under cryogenic environments and high-temperature cracking is prevented during welding. Therefore, the welding joint may be usefully applied to cryogenic containers such as liquefied natural gas (LNG) tanks.

In addition, the flux-cored arc welding wire according to the aspect of the present disclosure may be effectively used to form the welding joint having a high degree of low-temperature impact toughness and a high degree of room-temperature yield strength, and thus a welding structure having a high degree of impact toughness in cryogenic environments, for example, −196° C. or lower, may be formed using the flux-cored arc welding wire.

BEST MODE

Hereinafter, technical ideas of the present disclosure will be described according to exemplary embodiments.

First, a welding joint having a high degree of cryogenic toughness will be described according to an exemplary embodiment of the present disclosure.

The welding joint of the exemplary embodiment is formed by welding parts of a cryogenic high-strength high-manganese steel, and the welding joint includes, by wt %, carbon (C): 0.1% to 0.61%, silicon (Si): 0.23% to 1.0%, manganese (Mn): 14% to 35%, chromium (Cr): 6% or less, molybdenum (Mo): 1.45% to 3.5%, sulfur (S): 0.02% or less, phosphorus (P): 0.02% or less, boron (B): 0.001% to 0.01%, titanium (Ti): 0.001% to 0.2%, nitrogen (N): 0.001% to 0.3%, and a balance of iron (Fe) and inevitable impurities. The characteristics of the alloying elements and the critical significance of the content range of each of the alloying elements will now be simply described.

Carbon (C): 0.1 wt % to 0.61 wt %

Carbon (C) may be currently the most powerful element effective in guaranteeing the strength of the welding joint and stabilizing austenite that guarantees the cryogenic impact toughness of the welding joint. Thus, in the exemplary embodiment, the addition of carbon (C) is required. It may be sufficient that the lower limit of the content of carbon (C) be 0.1 wt %. However, if the content of carbon (C) is greater than 0.61 wt %, gases such as carbon dioxide gas may be generated during a welding process to cause defects in the welding joint, and carbon (C) may combine with alloying elements such as manganese (Mn) or chromium (Cr) and may form carbides such as MC or $M_{23}C_6$ to cause a decrease in low-temperature impact toughness. Therefore, it may be preferable that the content of carbon (C) be within a range of 0.1 wt % to 0.61 wt %.

Silicon (Si): 0.23 wt % to 1.0 wt %

Silicon (Si) is added to remove oxygen from the welding joint and guarantee the spreadability of welding beads. If the content of silicon (Si) is insufficient (that is, less than 0.23 wt %), the fluidity of the welding joint may decrease. Conversely, if the content of silicon (Si) is greater than 1.0 wt %, segregation may occur in the welding joint, thereby decreasing the low-temperature impact toughness of the welding joint and negatively affecting the weld crack sensitivity of the welding joint. Therefore, according to the exemplary embodiment of the present disclosure, it may be preferable that the content of silicon (Si) be within a range of 0.23 wt % to 1.0 wt %.

Manganese (Mn): 14 wt % to 35 wt %

Manganese (Mn) is an element facilitating the formation of austenite which is stable at a low temperature, and thus the addition of manganese (Mn) is required in the exemplary embodiment. Manganese (Mn) is relatively inexpensive compared to nickel (Ni). If the content of manganese (Mn) is less than 14 wt %, austenite is not sufficiently formed, and thus the cryogenic toughness of the welding joint may be very low. However, if the content of manganese (Mn) is greater than 35 wt %, segregation may occur excessively, and high-temperature cracking may occur. In addition, toxic fumes may be generated. Therefore, it may be preferable that the content of manganese (Mn) be within a range of 14 wt % to 35 wt %.

Chromium (Cr): 6 wt % or Less

Chromium (Cr) is a ferrite stabilizing element, and if a certain amount of chromium (Cr) is added, the amounts of austenite stabilizing elements may be decreased. Although chromium (Cr) is not added, if the contents of carbon (C) and manganese (Mn) are high, an austenite matrix may be maintained. Thus, the lower limit of the content of chromium (Cr) is zero. However, if the content of chromium (Cr) is greater than 6 wt %, chromium carbides may be excessively formed, and thus cryogenic toughness may decrease. Therefore, it may be preferable that the content of chromium (Cr) be within a range of 6 wt % or less.

Molybdenum (Mo): 1.45 wt % to 3.5 wt %

Molybdenum (Mo) may increase the strength of the matrix of the welding joint, and if the content of molybdenum (Mo) is greater than 1.45 wt %, the tensile strength of the welding joint may be 400 MPa or greater. In addition, molybdenum (Mo) included in austenitic welding materials narrows the width of a solid-liquid coexisting region during welding, thereby suppressing high-temperature cracking. However, if the content of molybdenum (Mo) is greater than 3.5 wt %, molybdenum carbides may be excessively formed, and thus cryogenic toughness may decrease. Therefore, it may be preferable that the content of molybdenum (Mo) be within a range of 1.45 wt % to 3.5 wt %.

Sulfur (S): 0.02 wt % or Less

Sulfur (S) leads to the formation of a complex precipitate, MnS. However, if the content of sulfur (S) is greater than 0.02 wt %, compounds having a low melting point such as FeS are formed, and thus high-temperature cracking may be caused. Therefore, it may be preferable that the content of sulfur (S) be within a range of 0.02 wt % or less.

Phosphorus (P): 0.02 wt % or Less

Phosphorus (P) has an effect on low-temperature impact toughness and forms brittle phosphorus compounds along grain boundaries. Therefore, the upper limit of the content of phosphorus (P) may preferably be 0.02 wt %.

Boron (B): 0.001 wt % to 0.01 wt %

Boron (B) segregates along grain boundaries. The segregation of boron (B) along grain boundaries improves the strength of the grain boundaries, and thus the strength of the welding joint may be improved. This effect is sufficiently obtained even when the content of boron (B) is 0.001 wt %. If the content of boron (B) is 0.01 wt % or greater, although strength is markedly increased, low-temperature impact toughness is decreased. Therefore, according to the exemplary embodiment of the present disclosure, it may be preferable that the content of boron (B) be within a range of 0.001 wt % to 0.01 wt %.

Titanium (Ti): 0.001 wt % to 0.2 wt %

Titanium (Ti) is included in the welding joint in the form of oxides or nitrides. Such oxides or nitrides (or carbonitrides) exist along grain boundaries and function as nuclei forming sites at high temperature during solidification, thereby decreasing the size of austenite grains. In addition, such oxides or nitrides (or carbonitrides) included in the microstructure of the welding joint improve the strength of the welding joint. This strength-increasing effect is obtainable even if the content of titanium (Ti) is 0.001 wt %. Thus, the lower limit of the titanium (Ti) is 0.001 wt % in the exemplary embodiment. However, if a large amount of titanium (Ti) is added, the impact toughness of the welding joint may decrease. For example, if the content of titanium (Ti) is greater than 0.2 wt %, although the strength of the welding joint markedly increases, the low-temperature impact toughness of the welding joint may decrease. Therefore, according to the exemplary embodiment of the present disclosure, it may be preferable that the content of titanium (Ti) be within a range of 0.001 wt % to 0.2 wt %.

Nitrogen (N): 0.001 wt % to 0.3 wt %

Nitrogen (N) has the same effect as carbon (C). Nitrogen (N) forms nitrides together with titanium (Ti). Even if the content of nitrogen (N) is 0.001 wt %, nitrogen (N) may improve the strength of the welding joint together with titanium (Ti). Therefore, the content of nitrogen (N) may preferably be 0.001 wt % or greater. However, if the content of nitrogen (N) is greater than 0.3 wt %, voids may easily be formed in the welding joint, and the cryogenic impact resistance of the welding joint may decrease because nitrogen (N) increases the formation of nitrides together with titanium (Ti). Therefore, the upper limit of the content of nitrogen (N) may preferably be 0.3 wt %.

The above-described alloying elements are basic alloying elements that may be included in the welding joint of the exemplary embodiment, and the following alloying elements may be further included in the welding joint so as to further improve the properties of the welding joint.

At least one selected from tungsten (W), niobium (Nb), and vanadium (V): 5 wt % or less in total content Tungsten (W), niobium (Nb), or vanadium (V) increases the strength of the welding joint at room temperature and may be optionally included in the welding joint of the exemplary embodiment. These elements combine with carbon (C) included in the welding joint and form carbides (or carbonitrides), thereby improving the tensile strength of the welding joint at room temperature. However, if the total content of these elements is greater than 5 wt %, cracks may easily be formed, and the cryogenic impact toughness of the welding joint may decrease. Therefore, the total content of at least one of tungsten (W), niobium (Nb), and vanadium (V) may preferably be set to be 5 wt % or less.

Yttrium (Y) and/or a Rare Earth Metal (REM): 0.1 wt % or Less

Yttrium (Y) and/or a rare earth metal (REM) may be optically included in the welding joint of the exemplary embodiment. Yttrium (Y) and/or a rare earth metal (REM) may form oxides at a high temperature, and the oxides may function as nuclei forming sites at a high temperature during solidification, thereby decreasing the size of austenite grains. In this manner, Yttrium (Y) and/or a rare earth metal (REM) improve the strength of the welding joint. However, if the content of yttrium (Y) and/or a rare earth metal (REM) is greater than 0.1 wt %, defects may be formed in the welding joint during a welding process. Thus, the content of yttrium (Y) and/or a rare earth metal (REM) may be adjusted to be 0.1 wt % or less. That is, according to the exemplary embodiment, the content of Yttrium (Y) and/or a rare earth metal (REM) may preferably be 0.1 wt % or less.

Nickel (Ni): 10% or Less

Nickel (Ni) may be optionally included in the welding joint of the exemplary embodiment as an austenite stabilizing element. If nickel (Ni) is added to the welding joint, the low-temperature impact toughness of the welding joint is steeply increased because nickel (Ni) increases the stacking fault energy of the welding joint. That is, nickel (Ni) increases the low-temperature impact toughness of the welding joint. In addition to decreasing the strength of the welding joint, nickel (Ni) increases the price of welding materials. Therefore, preferably, the content of nickel (Ni) may be adjusted to be 10 wt % or less.

The welding joint includes iron (Fe) and inevitable impurities in addition to the above-described alloying elements. However, the addition of other alloying elements is not precluded.

The welding joint of the exemplary embodiment may be applied to various high-manganese steels required to have high strength and high low-temperature impact toughness under very low temperature conditions. That is, the welding joint of the exemplary embodiment is not limited to use for base metals having particular compositions. For example, the welding joint of the exemplary embodiment may be applied to a high-manganese steel having $Mn_{24}C_{0.4}Cr_4Si_{0.3}$ as a basic composition.

Next, a flux-cored arc welding wire having a high degree of strength and a high degree of impact toughness will be described in detail according to an exemplary embodiment of the present disclosure.

The flux-cored arc welding wire of the exemplary embodiment includes, by wt %, carbon (C): 0.15% to 0.8%, silicon (Si): 0.2% to 1.2%, manganese (Mn): 15.0% to 34.0%, chromium (Cr): 6% or less, molybdenum (Mo): 1.5% to 4%, sulfur (S): 0.02% or less, phosphorus (P): 0.02% or less, boron (B): 0.01% or less, titanium (Ti): 0.09% to 0.5%, nitrogen (N): 0.001% to 0.3%, $TiO_2$: 4% to 15%, at least one selected from $SiO_2$, $ZrO_2$, and $Al_2O_3$: 0.01% to 9% in total content, at least one selected from potassium (K), sodium (Na), and lithium (Li): 0.5% to 1.7% in total content, at least one of fluorine (F) and calcium (Ca): 0.2% to 1.5%, and the balance of iron (Fe) and inevitable impurities. The characteristics of the alloying elements and the critical significance of the content range of each of the alloying elements will now be simply described.

Carbon (C): 0.15 wt % to 0.8 wt %

Carbon (C) may be currently the most powerful element effective in guaranteeing the strength of welding joints and stabilizing austenite that guarantees the cryogenic impact toughness of welding joints. Thus, in the exemplary embodiment, the addition of carbon (C) is required. If the content of carbon (C) is low, austenite is not stabilized, and thus it is required to properly maintain the content of carbon (C). The lower limit of the content of carbon (C) is set to be 0.15 wt %. If the content of carbon (C) is greater than 0.8 wt %, gases such as carbon dioxide gas may be generated during a welding process to cause defects in welding joints, and carbon (C) may combine with alloying elements such as manganese (Mn) or chromium (Cr) and may form carbides such as MC or $M_{23}C_6$ to cause a decrease in low-temperature impact toughness. Therefore, according to the exemplary embodiment of the present disclosure, it may be preferable that the content of carbon (C) be within a range of 0.15 wt % to 0.8 wt %.

Silicon (Si): 0.2 wt % to 1.2 wt %

If the content of silicon (Si) is less than 0.2 wt %, oxygen may be insufficiently removed from welding joints, and the fluidity of welding joints may decrease. Conversely, if the content of silicon (Si) is greater than 1.2 wt %, segregation may occur in welding joints, thereby causing a decrease in low-temperature impact toughness and having a negative effect on weld crack sensitivity. Therefore, according to the exemplary embodiment of the present disclosure, it may be preferable that the content of silicon (Si) be within a range of 0.2 wt % to 1.2 wt %.

Manganese (Mn): 15.0 wt % to 34.0 wt %

Manganese (Mn) increases work hardening and leads to the formation of austenite which is stable at low temperatures. Thus, manganese (Mn) is added to the wire of the exemplary embodiment. In addition, manganese (Mn) forms carbides together with carbon (C) and functions as an austenite stabilizing element like nickel (Ni).

If the content of manganese (Mn) is less than 15.0 wt %, austenite is not sufficiently formed, and thus low-temperature impact toughness decreases. Conversely, if the content of manganese (Mn) is greater than 34.0 wt %, large amounts of fumes are generated during welding. Thus, it may be preferable that the content of manganese (Mn) be within the range of 15.0 wt % to 34.0 wt %.

Chromium (Cr): 6.0 wt % or Less

Chromium (Cr) is a ferrite stabilizing element, and the addition of chromium (Cr) enables decreasing the amounts of austenite stabilizing elements. In addition, chromium (Cr) facilitates the formation of carbides such as MC or $M_{23}C_6$. That is, the addition of a certain amount of chromium (Cr) increases precipitation hardening and enables decreasing the amounts of austenite stabilizing elements. Therefore, a certain amount of chromium (Cr) may be added. However, the addition of chromium (Cr) is optional. In addition, since chromium (Cr) is a powerful anti-oxidation element, the addition of chromium (Cr) may increase resistance to oxidation in an oxygen atmosphere.

However, if the content of chromium (Cr) is greater than 6.0 wt %, the manufacturing costs of the flux-cored arc welding wire may increase, and the cryogenic impact toughness of the flux-cored arc welding wire may markedly decreases because of precipitation. Therefore, it may be preferable that a content of chromium (Cr) be within the range of 6.0 wt % or less.

Molybdenum (Mo): 1.5 wt % to 4.0 wt %

Molybdenum (Mo) is an element increasing the strength of welding joints. In the exemplary embodiment, molybdenum (Mo) added to a welding material in an amount of 1.5 wt % or greater has an effect of increasing the tensile strength of welding joints to 400 MPa or greater. In addition, molybdenum (Mo) included in austenitic welding materials narrows the width of a solid-liquid coexisting region during welding, thereby suppressing high-temperature cracking. However, if the content of molybdenum (Mo) is greater than 4.0 wt %, molybdenum carbides may be excessively formed in welding joints, and thus the cryogenic toughness of the welding joints may decrease. Therefore, it may be preferable that the content of molybdenum (Mo) be within a range of 1.5 wt % to 4.0 wt %.

Phosphorus (P): 0.02 wt % or Less

Phosphorous (P) is an impurity causing high-temperature cracking, and thus the content of phosphorus (P) is adjusted to be as low as possible. That is, preferably, the content of phosphorus (P) is adjusted to be 0.02 wt % or less so as to prevent high-temperature cracking.

Sulfur (S): 0.02 wt % or Less

Sulfur (S) is an impurity causing high-temperature cracking together with phosphorus (P), and thus the content of phosphorus (P) is adjusted to be as low as possible. If the content of sulfur (S) is greater than 0.02 wt %, compounds having a low melting point such as FeS are formed, and thus high-temperature cracking may be induced. Therefore, preferably, the content of sulfur (S) is adjusted to be 0.02 wt % or less so as to prevent high-temperature cracking.

Boron (B): 0.01 wt % or Less

Boron (B) segregates along grain boundaries of welding joints. The segregation of boron (B) along grain boundaries improves the strength of the grain boundaries, and thus the strength of welding joints may be improved. Although the content of boron (B) is 0.001 wt %, these effects are sufficiently obtained. If the content of boron (B) is greater than 0.01 wt %, although the strength of welding joints is markedly increased, the low-temperature impact toughness of the welding joints is decreased. Therefore, the upper limit of the content of boron (B) may preferably be 0.01 wt %.

Titanium (Ti): 0.09 wt % to 0.5 wt %

During welding, titanium (Ti) functions as an arc stabilizer and an oxidizer, thereby making welding joints clean. In addition, after welding, titanium (Ti) included in welding joints leads to the formation of oxides and nitrides (or carbonitrides) and thus increases the strength of the welding joints. Therefore, it may be preferable that the content of titanium (Ti) be within the range of 0.09 wt % or greater. However, after welding, titanium (Ti) included in welding joints in large amounts decreases the impact toughness of the welding joints. If the content of titanium (Ti) is greater than 0.5 wt %, low-temperature impact toughness may decrease although strength markedly increases. Therefore, the upper limit of the content of titanium (Ti) may preferably be 0.5 wt %.

Nitrogen (N): 0.001 wt % to 0.3 wt %

Nitrogen (N) improves corrosion resistance and stabilizes austenite. That is, the addition of nitrogen (N) leads to an effect similar to the effect obtainable by the addition of carbon (C). Therefore, nitrogen (N) may be substituted for carbon (C). These effects of nitrogen (N) may be obtained even though a small amount of nitrogen (N) is added. However, if the content of nitrogen (N) is greater than 0.3 wt %, impact resistance markedly decreases. Thus, it may be preferable that the content of nitrogen (N) be within a range of 0.001 wt % to 0.3 wt %.

$TiO_2$ (Titanium Dioxide): 4 wt % to 15 wt %

Titanium dioxide ($TiO_2$) is a slag former solidifying before a liquid welding joint solidifies, thereby preventing the liquid welding joint from flowing downward and allowing for all-position welding. In the exemplary embodiment, preferably, $TiO_2$ is added in an amount of 4 wt % or greater so as to obtain the above-described effects. However, if the content of $TiO_2$ is greater than 15 wt %, the contents of oxides in welding joints may markedly increase, and thus the low-temperature impact toughness of the welding joints may decrease. Therefore, according to the exemplary embodiment of the present disclosure, it may be preferable that the content of $TiO_2$ be within a range of 4 wt % to 15 wt %.

At least one selected from $SiO_2$, $ZrO_2$, and $Al_2O_3$: 0.01 wt % to 9.0 wt % in total content If the total content of at least one of $SiO_2$, $ZrO_2$, and $Al_2O_3$ is 0.01 wt %, the workability of all-position welding and the quality of weld beads may decrease because of poor application and separation of slag and generation of unstable arcs. Conversely, if the content of at least one of $SiO_2$, $ZrO_2$, and $Al_2O_3$ is greater than 9 wt %, the amount and viscosity of molten slag may markedly increase, thereby worsening all-position weldability and bead shapes. In addition, larger amounts of elements such as silicon (Si) or aluminum (Al) may be included in deposited metal, and thus impact toughness may decrease.

Therefore, it may be preferable that the total content of at least one of $SiO_2$, $ZrO_2$, and $Al_2O_3$ be within a range of 0.01 wt % to 9 wt %.

At Least One Selected from Potassium (K), Sodium (Na), Lithium (Li): 0.5 wt % to 1.7 wt % in Total Content During welding, these alkali metals may decrease the ionization potential of arcs, and thus arcs may be easily generated and stably maintained. When the total content of these alkali metals is 0.5 wt % or greater, these effects may be certainly obtained. However, if the content of these alkali metals is greater than 1.7 wt %, fumes may be excessively generated because of high vapor pressure. The alkali metals may include one or more of potassium (K), sodium (Na), and lithium (Li). In the exemplary embodiment, effects obtainable by the addition of the alkali metals have no relationship with the content of each of the alkali metals.

Fluorine (F) and/or Calcium (Ca): 0.2 wt % to 1.5 wt %

If the welding wire of the exemplary embodiment further includes calcium (Ca) and fluorine (F) in the form of a compound of fluorine (F) with an alkali metal or an alkaline earth metal, effects of the exemplary embodiment may be improved. If fluoride is added to the welding wire in an amount of 0.2 wt % or greater, fluorine (F) may appear in high-temperature arcs and react with hydrogen during welding, thereby effectively removing diffusion hydrogen by a dehydrogenation reaction. However, if the content of fluoride is greater than 1.5 wt %, fumes may be excessively generated because of high vapor pressure, and the slag viscosity of a rutile-containing weld pool in which $TiO_2$ is contained as a main slag component may be excessively decreased to result in the formation of unstable beads. Therefore, it may be preferable that the content of fluorine (F) and/or calcium (Ca) be within the range of 0.2 wt % to 1.5 wt %.

The above-described alloying elements are basic alloying elements that may be included in the welding wire of the exemplary embodiment, and the following alloying elements may be further included in the welding wire so as to further improve the properties of the welding wire.

At Least One Selected from Tungsten (W), Niobium (Nb), and Vanadium (V): 5 wt % or Less in Total Content Tungsten (W), niobium (Nb), and vanadium (V) increase the room-temperature strength of the welding wire. These elements combine with carbon (C) included in welding joints and form carbides (or carbonitrides), thereby improving the tensile strength of the welding joints at room temperature. However, if the total content of tungsten (W), niobium (Nb), and vanadium (V) is greater than 5 wt %, cracks may easily be formed, and cryogenic impact toughness may decrease. Therefore, according to the exemplary embodiment of the present disclosure, it may be preferable that the total content of tungsten (W), niobium (Nb), and vanadium (V) be within a range of 5 wt % or less.

Yttrium (Y) and/or REM: 1 wt % or Less

Yttrium (Y) and a rare earth metal (REM) function as a powerful oxidizer and stabilize arcs during welding. In addition, yttrium (Y) and a rare earth metal (REM) form oxides in welding joints, and the oxides function as nuclei forming sites at high temperature during solidification, thereby decreasing the size of austenite grains. In this manner, yttrium (Y) and/or a rare earth metal (REM) improve the strength of welding joints. However, if the content of yttrium (Y) and/or a rare earth metal (REM) is greater than 1 wt %, defects may be formed in welding joints during a welding process. Thus, the content of yttrium (Y) and/or a rare earth metal (REM) may be adjusted to be 1 wt % or less. That is, according to the exemplary embodiment, the content of Yttrium (Y) and/or rare earth metal (REM) may preferably be 1 wt % or less.

Nickel (Ni): 10% or Less

Nickel (Ni) is an element stabilizing austenite. Nickel (Ni) steeply increases the low-temperature impact toughness of welding joints by increasing the stacking fault energy of the welding joints. However, nickel (Ni) decreases strength and increases the price of welding materials. Therefore, preferably, the content of nickel (Ni) may be adjusted to be 10 wt % or less.

The welding wire includes iron (Fe) and inevitable impurities in addition to the above-described alloying elements. However, the addition of other alloying elements is not precluded.

Hereinafter, the exemplary embodiments of the present disclosure will be described more specifically through examples. However, the following examples should be considered in a descriptive sense only and not for purpose of limitation. The scope of the present invention is defined by the appended claims, and modifications and variations may reasonably made therefrom.

BEST MODE FOR INVENTION

Example 1

Flux-cored arc welding wires having a diameter of 1.2 mm were prepared. The flux-cored arc welding wires included, by wt %, carbon (C): 0.15% to 0.8%, silicon (Si): 0.2% to 1.2%, manganese (Mn): 15% to 34%, chromium (Cr): 6% or less, molybdenum (Mo): 1.5% to 4%, sulfur (S): 0.02% or less, phosphorus (P): 0.02% or less, boron (B): 0.01% or less, titanium (Ti): 0.09% to 0.5%, nitrogen (N): 0.001% to 0.3%, $TiO_2$: 4% to 15%, at least one selected from $SiO_2$, $ZrO_2$, and $Al_2O_3$: 0.01% to 9% in total content, at least one selected from potassium (K), sodium (Na), and lithium (Li): 0.5% to 1.7% in total content, at least one of fluorine (F) and calcium (Ca): 0.2% to 1.5%, and a balance of iron (Fe) and inevitable impurities.

Cryogenic high-manganese steel having a basic composition of $Mn_{24}C_{0.4}Cr_4Si_{0.3}$ was used as a base metal, and parts of the base metal were welded together using the flux-cored arc welding wires. The welding process was performed under conditions of a 100% $CO_2$ protection gas, about 290 A DC, about 30 V DC, about 31 CPM, and a heat input of about 1.7 kJ/mm. In addition, an interlayer temperature was lower than 150° C., and a preheating temperature was about 100° C. to remove only moisture.

The compositions of welding joints formed through the welding process were analyzed as illustrated in Table 1 below. In addition, the low-temperature impact toughness and tensile strength of the welding joints were measured according to the compositions of the welding joints as illustrated in Table 1 below. In detail, a Charpy impact test was performed (at −196° C.) to evaluate mechanical properties of the welding joints, and results (J) of the test are shown in Table 1 below. In addition, the tensile strength (MPa) of the welding joints was measured as illustrated in Table 1 below.

TABLE 1

| | Composition of welding joint (wt %) | | | | | | | | | | | | | |
|---|---|---|---|---|---|---|---|---|---|---|---|---|---|---|
| | C | Mn | Si | Cr | P | S | N | Mo | B | Ti | Ni | V + Nb + W | Y + REM | IP (J) | RTTS |
| IS1 | 0.12 | 28.2 | 0.65 | 1.95 | 0.011 | 0.007 | 0.1 | 1.67 | 0.002 | 0.05 | 4.7 | 4.32 | — | 28 | 513.4 |
| IS2 | 0.58 | 18.1 | 0.52 | 1.87 | 0.013 | 0.008 | 0.001 | 1.52 | 0.001 | 0.04 | — | 2.34 | — | 29 | 480.9 |
| IS3 | 0.33 | 20.1 | 0.23 | 0.01 | 0.012 | 0.008 | 0.001 | 1.52 | 0.004 | 0.11 | 5.3 | 1.23 | — | 32 | 448.6 |
| CS1 | 0.32 | 18.7 | 0.52 | 6.52 | 0.014 | 0.01 | 0.04 | 2.03 | 0.002 | 0.03 | 5.1 | — | — | 14 | 567.7 |
| CS2 | 0.75 | 15.2 | 0.52 | 0.02 | 0.021 | 0.023 | 0.001 | 1.75 | 0.001 | 0.01 | — | — | — | Cracks | |
| CS3 | 0.58 | 16.2 | 1.23 | 0.03 | 0.014 | 0.005 | 0.001 | 1.72 | 0.001 | 0.03 | — | — | — | Cracks | |
| CS4 | 0.58 | 18.4 | 0.42 | 1.78 | 0.012 | 0.006 | 0.002 | 1.65 | 0.001 | 0.04 | — | — | — | Voids | |

IS: Inventive Sample,
CS: Comparative Sample,
IP: Impact Property,
RTTS: Room-Temperature Tensile Strength As illustrated in Table 1 above, in the case of Inventive Samples 1 to 3 having compositions proposed in the exemplary embodiment of the present disclosure, the welding joints had a degree of low-temperature impact toughness within the range of 28 J or greater and a degree of tensile strength within the range of greater than 400 MPa.

However, in the case of Comparative Sample 1 having an excessively high chromium content, the welding joint had a poor degree of low-temperature impact toughness, 14 J, even though the tensile strength of the welding joint was high. In the case of Comparative Sample 2 having an excessively high silicon content, cracks were observed in the welding joint after the welding process, and in the case of Comparative Sample 3 having an excessively high nitrogen content, voids were formed in the welding joint. In the case of Comparative Sample 4 having a high rare earth element content, voids were formed in the welding joint.

Example 2

Submerged arc welding solid wires having a diameter of 4.0 mm were prepared. The submerged arc welding solid wires included, by wt %, carbon (C): 0.15% to 0.8%, silicon (Si): 0.5% to 1.5%, manganese (Mn): 15% to 32%, chromium (Cr): 5.5% or less, molybdenum (Mo): 1.5% to 3%, sulfur (S): 0.025% or less, phosphorus (P): 0.025% or less, boron (B): 0.01% or less, titanium (Ti): 0.05% to 1.2%, nitrogen (N): 0.005% to 0.5%, and a balance of iron (Fe) and inevitable impurities. Optionally, the submerged arc welding solid wires included at least one of tungsten (W), niobium (Nb), and vanadium (V): 6 wt % or less in total content, yttrium (Y) and/or a rare earth metal (REM): 1 wt % or less, and nickel (Ni): 10 wt % or less.

Cryogenic high-manganese steel having a basic composition of $Mn_{24}C_{0.4}Cr_4Si_{0.3}$ was used as a base metal, and parts of the base metal were welded together using the submerged arc welding solid wires. In the welding, an alumina basic flux was used. The welding process was performed under conditions of about 600 A DC, about 32 V DC, about 29 CPM, and a heat input of about 4.0 kJ/mm. In addition, an interlayer temperature was lower than 150° C., and a preheating temperature was about 100° C. to remove only moisture.

The compositions of welding joints formed through the welding process were analyzed as illustrated in Table 2 below. In addition, the low-temperature impact toughness and tensile strength of the welding joints were measured according to the compositions of the welding joints as illustrated in Table 2 below. In detail, a Charpy impact test was performed (at −196° C.) to evaluate mechanical properties of the welding joints, and results (J) of the test are shown in Table 2 below. In addition, the tensile strength (MPa) of the welding joints was measured as illustrated in Table 2 below.

TABLE 2

| | Composition of welding joint (wt %) | | | | | | | | | | | | | | |
|---|---|---|---|---|---|---|---|---|---|---|---|---|---|---|---|
| | C | Mn | Si | Cr | P | S | N | Mo | B | Ti | Ni | V + Nb + W | Y + REM | IP (J) | RTTS |
| IS1 | 0.1 | 34.2 | 0.95 | 3.23 | 0.006 | 0.005 | 0.26 | 3.25 | 0.01 | 0.2 | 9.1 | — | — | 54 | 477.6 |
| IS2 | 0.31 | 25.1 | 0.65 | 5.12 | 0.017 | 0.009 | 0.11 | 2.12 | 0.006 | 0.092 | 4.3 | — | — | 32 | 524.9 |
| IS3 | 0.59 | 15.2 | 0.28 | 0.03 | 0.012 | 0.017 | 0.004 | 1.54 | 0.001 | 0.04 | — | — | — | 31 | 427.5 |
| IS4 | 0.1 | 28.7 | 0.62 | 2.1 | 0.012 | 0.008 | 0.09 | 1.87 | 0.003 | 0.07 | 5.1 | 4.12 | — | 27 | 522.5 |
| IS5 | 0.52 | 20.8 | 0.58 | 1.73 | 0.015 | 0.01 | 0.004 | 1.54 | 0.001 | 0.002 | — | 2.12 | — | 29 | 474.7 |
| IS6 | 0.35 | 20.8 | 0.24 | 0.05 | 0.013 | 0.007 | 0.005 | 1.75 | 0.005 | 0.01 | 5.2 | 1.1 | — | 34 | 437.5 |
| IS7 | 0.31 | 19.5 | 0.48 | 1.11 | 0.014 | 0.008 | 0.13 | 2.05 | 0.002 | 0.14 | 5.3 | — | 0.005 | 41 | 452.9 |
| CS1 | 0.34 | 18.9 | 0.54 | 6.73 | 0.014 | 0.008 | 0.013 | 1.95 | 0.003 | 0.001 | 5.3 | — | — | 16 | 567.5 |
| CS2 | 0.58 | 19.4 | 0.54 | 1.93 | 0.011 | 0.007 | 0.091 | 1.78 | 0.02 | 0.27 | — | — | — | 25 | 478.2 |
| CS3 | 0.18 | 31.2 | 0.46 | 0.03 | 0.014 | 0.007 | 0.004 | 1.38 | 0.002 | 0.04 | 9.1 | — | — | 39 | 396.1 |
| CS4 | 0.74 | 16.9 | 0.62 | 0.03 | 0.025 | 0.024 | 0.005 | 1.67 | 0.002 | 0.05 | — | — | — | Cracks | |
| CS5 | 0.62 | 15.9 | 1.52 | 0.01 | 0.015 | 0.006 | 0.003 | 1.78 | 0.001 | 0.04 | — | — | — | Cracks | |
| CS6 | 0.56 | 15.5 | 0.66 | 0.01 | 0.013 | 0.008 | 0.36 | 1.52 | 0.002 | 0.04 | — | — | — | Voids | |
| CS7 | 0.62 | 18.9 | 0.49 | 1.92 | 0.014 | 0.008 | 0.004 | 1.56 | 0.001 | 0.002 | — | — | 0.17 | Voids | |

IS: Inventive Sample,
CS: Comparative Sample,
IP: Impact Property,
RTTS: Room-Temperature Tensile Strength As illustrated in Table 2 above, in the case of Inventive Samples 1 to 7 having compositions proposed in the exemplary embodiment of the present disclosure, the welding joints had a degree of low-temperature impact toughness within the range of 27 J or greater and a degree of tensile strength within the range of greater than 400 MPa.

However, in the case of Comparative Samples 1 and 2 having a high chromium or boron content, the welding joints had a poor degree of low-temperature impact toughness, 25 J, even though the tensile strength of the welding joints was high. In the case of Comparative Sample 3 having an excessively low molybdenum content, the tensile strength of the welding joint was low, 400 MPa or less, even though the low-temperature impact toughness of the welding joint was high. In the case of Comparative Sample 4 having excessively large amounts of carbon (C), phosphorus (P), and sulfur (S), cracks were formed in the welding joint, and in the case of Comparative Sample 5 having excessively large amounts of carbon (C) and silicon (Si), cracks were formed in the welding joint.

In the case of Comparative Sample 6 having an excessively large amount of nitrogen (N) and Comparative Sample 7 having excessively large amounts of carbon (C) and a rare earth metal (REM), voids were observed in the welding joints after the welding process.

The compositions of welding joints formed through the welding process were analyzed as illustrated in Table 3 below. In addition, the low-temperature impact toughness and tensile strength of the welding joints were measured according to the compositions of the welding joints as illustrated in Table 3 below. In detail, a Charpy impact test was performed (at −196° C.) to evaluate mechanical properties of the welding joints, and results (J) of the test are shown in Table 3 below. In addition, the tensile strength (MPa) of the welding joints was measured as illustrated in Table 3 below.

TABLE 3

| | Composition of welding joint (wt %) | | | | | | | | | | | | | | |
|---|---|---|---|---|---|---|---|---|---|---|---|---|---|---|---|
| | C | Mn | Si | Cr | P | S | N | Mo | B | Ti | Ni | V + Nb + W | Y + REM | IP (J) | RTTS |
| IS1 | 0.11 | 32.3 | 0.89 | 3.25 | 0.005 | 0.002 | 0.23 | 2.54 | 0.009 | 0.19 | 8.2 | — | — | 53 | 476.9 |
| IS2 | 0.32 | 29.8 | 0.62 | 5.52 | 0.018 | 0.01 | 0.12 | 2.23 | 0.005 | 0.12 | 4.5 | — | — | 35 | 518.4 |
| IS3 | 0.61 | 14.2 | 0.23 | 0.02 | 0.013 | 0.015 | 0.002 | 1.55 | 0.002 | 0.002 | — | — | — | 31 | 424.0 |
| IS4 | 0.29 | 19.3 | 0.45 | 1.23 | 0.012 | 0.009 | 0.12 | 2.19 | 0.001 | 0.13 | 5.1 | — | 0.06 | 36 | 463.7 |
| CS1 | 0.57 | 18.2 | 0.52 | 1.87 | 0.01 | 0.007 | 0.082 | 1.75 | 0.019 | 0.25 | — | — | — | 24 | 480.8 |
| CS2 | 0.19 | 32.5 | 0.47 | 0.03 | 0.012 | 0.007 | 0.002 | 1.4 | 0.001 | 0.002 | 8.2 | — | — | 42 | 392.1 |
| CS3 | 0.57 | 17.2 | 0.57 | 0.02 | 0.013 | 0.006 | 0.35 | 1.54 | 0.002 | 0.002 | — | — | — | Voids | |

IS: Inventive Sample,
CS: Comparative Sample,
IP: Impact Property,
RTTS: Room-Temperature Tensile Strength As illustrated in Table 3 above, in the case of Inventive Samples 1 to 4 having compositions proposed in the exemplary embodiment of the present disclosure, the welding joints had a degree of low-temperature impact toughness within a range of 31 J or greater and a degree of tensile strength within a range of greater than 400 MPa.

However, in the case of Comparative Sample 1 having an excessively high boron content, the welding joint had a poor degree of low-temperature impact toughness, 24 J, even though the tensile strength of the welding joint was high. In the case of Comparative Sample 2 having an excessively low molybdenum content, the welding joint had a poor degree of tensile strength, 392.1 MPa, even though the low-temperature impact toughness of the welding joint was high.

In the case of Comparative Sample 3 having an excessively high nitrogen content, voids were observed in the welding joint after the welding process.

Example 3

Gas metal arc welding wires having a diameter of 1.2 mm were prepared. The gas metal arc welding wires had the same compositions as the submerged arc welding solid wires of Example 2.

Cryogenic high-manganese steel having a basic composition of $Mn_{24}C_{0.4}Cr_4Si_{0.3}$ was used as a base metal, and parts of the base metal were welded together using the gas metal arc welding wires. The welding process was performed under conditions of about 200 A DC, about 30 V DC, about 40 CPM, and a heat input of about 0.9 kJ/mm. In addition, an interlayer temperature was lower than 150° C., and a preheating temperature was about 100° C. to remove only moisture.

Example 4

Flux-cored arc welding wires having a diameter of 1.2 mm were prepared as illustrated in Table 4 below. Cryogenic high-manganese steel having a basic composition of $Mn_{24}C_{0.4}Cr_4Si_{0.3}$ was used as a base metal, and parts of the base metal were welded together using the flux-cored arc welding wires. The welding process was performed under conditions of a 100% $CO_2$ protection gas, about 290 A DC, about 30 V DC, about 31 CPM, and a heat input of about 1.7 kJ/mm. In addition, an interlayer temperature was lower than 150° C., and a preheating temperature was about 100° C. to remove only moisture.

TABLE 4

| | C | Mn | Si | Cr | P | S | N | Mo | B | Ti | Ni | A1 | A2 | A3 | A4 | A5 | A6 | W | IP (J) | TS |
|---|---|---|---|---|---|---|---|---|---|---|---|---|---|---|---|---|---|---|---|---|
| IS1 | 0.1 | 34 | 1.2 | 3.5 | 0.01 | 0.005 | 0.26 | 3.5 | 0.01 | 0.5 | 9.5 | — | — | 13 | 0.01 | 1.7 | 1.5 | Good | 54 | 477.6 |
| IS2 | 0.3 | 30 | 0.7 | 5.5 | 0.02 | 0.01 | 0.12 | 2.5 | 0.005 | 0.3 | 4.5 | — | — | 9 | 1 | 1 | 1 | Good | 35 | 518.4 |
| IS3 | 0.6 | 15 | 0.4 | 0.02 | 0.01 | 0.02 | 0.004 | 1.5 | 0.001 | 0.1 | — | — | — | 4 | 3 | 0.5 | 0.5 | Good | 31 | 427.48 |
| IS4 | 0.1 | 30 | 0.7 | 2 | 0.01 | 0.01 | 0.09 | 2 | 0.005 | 0.1 | 5 | 4.5 | — | 15 | 3 | 1 | 0.6 | Good | 27 | 522.5 |
| IS5 | 0.6 | 19 | 0.6 | 2 | 0.02 | 0.01 | 0.001 | 1.5 | 0.001 | 0.09 | — | 2.5 | — | 6 | 6 | 1 | 0.2 | Good | 29 | 480.92 |
| IS6 | 0.3 | 20 | 0.2 | 0.02 | 0.015 | 0.01 | 0.001 | 1.5 | 0.005 | 0.25 | 5.5 | 1.5 | — | 6 | 3 | 0.5 | 0.5 | Good | 32 | 448.62 |
| IS7 | 0.3 | 20 | 0.6 | 1.2 | 0.015 | 0.01 | 0.13 | 2.5 | 0.005 | 0.25 | 5.5 | — | 0.25 | 7 | 9 | 0.5 | 0.5 | Good | 41 | 452.9 |
| CS1 | 0.3 | 20 | 0.6 | 6.5 | 0.015 | 0.01 | 0.04 | 2.5 | 0.005 | 0.1 | 5.5 | — | — | 7 | 5 | 0.5 | 0.5 | Good | 14 | 567.7 |
| CS2 | 0.6 | 20 | 0.6 | 1.9 | 0.01 | 0.01 | 0.082 | 2 | 0.02 | 0.6 | — | — | — | 8 | 5 | 0.5 | 0.5 | Good | 24 | 480.84 |
| CS3 | 0.2 | 31 | 0.6 | 0.05 | 0.015 | 0.01 | 0.004 | 1.4 | 0.005 | 0.1 | 9 | — | — | 7 | 5 | 0.5 | 0.5 | Good | 39 | 396.08 |
| CS4 | 0.75 | 15 | 0.6 | 0.02 | 0.025 | 0.25 | 0.001 | 2 | 0.001 | 0.01 | — | — | — | 6 | 1 | 0.5 | 0.2 | Poor (cracks) | | |
| CS5 | 0.6 | 16 | 1.3 | 0.02 | 0.015 | 0.005 | 0.001 | 2 | 0.001 | 0.03 | — | — | — | 7 | 2 | 1.7 | 0.2 | Poor (cracks) | | |
| CS6 | 0.6 | 16 | 0.7 | 0.01 | 0.015 | 0.01 | 0.36 | 1.5 | 0.001 | 0.04 | — | — | — | 8 | 4 | 0.5 | 0.4 | Poor (voids) | | |
| CS7 | 0.6 | 19 | 0.5 | 1.78 | 0.015 | 0.01 | 0.002 | 2 | 0.001 | 0.04 | — | — | 1.25 | 7 | 2 | 0.5 | 0.2 | Poor (voids) | | |
| CS8 | 0.6 | 15 | 0.4 | 0.02 | 0.015 | 0.01 | 0.004 | 1.5 | 0.001 | 0.1 | — | — | — | 17 | 3 | 0.01 | 0.5 | Impossible | | |
| CS9 | 0.6 | 15 | 0.7 | 5.5 | 0.01 | 0.02 | 0.001 | 1.5 | 0.001 | 0.1 | — | — | — | 6 | 10 | 0.01 | 0.5 | Impossible | | |
| CS10 | 0.3 | 30 | 0.4 | 0.02 | 0.015 | 0.01 | 0.12 | 2.5 | 0.005 | 0.3 | 4.5 | — | — | 5 | 6 | 0.5 | 2 | Impossible | | |

IS: Inventive Sample,
CS: Comparative Sample,
W: weldability,
IP: Impact Property,
TS: Tensile Strength,
A1: V + Nb + W,
A2: Y + REM,
A3: $TiO_2$,
A4: $SiO_2 + ZrO_2 + Al_2O_3$,
A5: K + Na + Li, and
A6: F + Ca.

A Charpy impact test was performed (at −196° C.) to evaluate mechanical properties of welding joints formed through the welding process, and results (J) of the test are shown in Table 4 above. In addition, the tensile strength (MPa) of the welding joints was measured as illustrated in Table 4 above. Those properties of the welding joints were measured according to Korean Industrial Standards (KS), and the weldability of the welding joints was evaluated with the naked eye.

As illustrated in Table 4 above, in the case of Inventive Samples 1 to 7 (flux-cored arc welding wires) having compositions proposed in the exemplary embodiment of the present disclosure, the welding joints had a high degree of weldability, a degree of low-temperature impact toughness with the range of 27 J or greater, and a degree of tensile strength within a range of 400 MPa or greater. That is, the welding joints had satisfactory mechanical properties.

However, in the case of Comparative Sample 1 having an excessively high chromium content, the low-temperature impact toughness of the welding joint was poor, and in the case of Comparative Sample 2 having boron and titanium contents outside the ranges proposed in the exemplary embodiment of the present disclosure, the low-temperature impact toughness of the welding joint was also poor. In the case of Comparative Sample 3 having a molybdenum content outside the range proposed in the exemplary embodiment of the present disclosure, the welding joint had a poor degree of tensile strength, 396.08 MPa, even though the low-temperature impact toughness of the welding joint was high.

Furthermore, in the case of Comparative Samples 4 and 5 having phosphorus and sulfur contents or silicon and titanium contents outside the ranges proposed in the exemplary embodiment of the present disclosure, cracks were observed in the welding joints after the welding process, and in the case of Comparative Samples 6 and 7 having a nitrogen or titanium outside the range proposed in the exemplary embodiment of the present disclosure, voids were formed in the welding joints.

In the case of Comparative Samples 8 to 10 having a content of $TiO_2$, $SiO_2+ZrO_2+Al_2O_3$, K+Na+Li, or F+Ca outside the range proposed in the exemplary embodiment of the present disclosure, cracks were formed at a high temperature during the welding process, and thus welding was impossible.

While exemplary embodiments have been shown and described above, it will be apparent to those skilled in the art that modifications and variations could be made without departing from the scope of the present invention as defined by the appended claims.

What is claimed are:

1. A flux-cored arc welding wire having a high degree of strength and a high degree of cryogenic impact toughness, the flux-cored arc welding wire comprises, wt %, carbon (C): 0.15% to 0.8%, silicon (Si): 0.2% to 1.2%, manganese (Mn): 15% to 34%, chromium (Cr): 6% or less, molybdenum (Mo): 1.5% to 4%, sulfur (S): 0.02% or less, phosphorus (P): 0.02% or less, boron (B): 0.01% or less, titanium (Ti): 0.09% to 0.5%, nitrogen (N): 0.001% to 0.3%, $TiO_2$: 4% to 15%, at least one selected from $SiO_2$, $ZrO_2$, and $Al_2O_3$: 0.01% to 9% in total content, at least one selected from potassium (K), sodium (Na), and lithium (Li): 0.5% to 1.7% in total content, at least one of fluorine (F) and calcium (Ca): 0.2% to 1.5%, and a balance of iron (Fe) and inevitable impurities.

2. The flux-cored arc welding wire of claim 1, further comprising at least one selected from tungsten (W), niobium (Nb), and vanadium (V) in a total amount of 5 wt % or less.

3. The flux-cored arc welding wire of claim 1, further comprising yttrium (Y) and/or a rare earth metal (REM) in an amount of 1 wt % or less.

4. The flux-cored arc welding wire of claim 1, further comprising nickel (Ni) in an amount of 10 wt % or less.

\* \* \* \* \*